(12) United States Patent
Zhang et al.

(10) Patent No.: US 10,579,539 B2
(45) Date of Patent: Mar. 3, 2020

(54) STORAGE INFRASTRUCTURE AND METHOD FOR EXPLOITING IN-STORAGE TRANSPARENT COMPRESSION USING A DUMMY FILE THAT CONSUMES LBA STORAGE WITHOUT CONSUMING PBA STORAGE

(71) Applicant: ScaleFlux, Inc., San Jose, CA (US)

(72) Inventors: Tong Zhang, Albany, NY (US); Yang Liu, Milpitas, CA (US); Fei Sun, Irvine, CA (US); Hao Zhong, Los Gatos, CA (US)

(73) Assignee: SCALEFLUX, INC., San Jose, CA (US)

( * ) Notice: Subject to any disclaimer, the term of this patent is extended or adjusted under 35 U.S.C. 154(b) by 0 days.

(21) Appl. No.: 16/048,627

(22) Filed: Jul. 30, 2018

(65) Prior Publication Data

US 2019/0042459 A1 Feb. 7, 2019

Related U.S. Application Data

(60) Provisional application No. 62/540,468, filed on Aug. 2, 2017.

(51) Int. Cl.
*G06F 12/10* (2016.01)
*G06F 16/174* (2019.01)
*G06F 12/02* (2006.01)

(52) U.S. Cl.
CPC ............ *G06F 12/10* (2013.01); *G06F 12/023* (2013.01); *G06F 16/1744* (2019.01);
(Continued)

(58) Field of Classification Search
CPC ................ G06F 12/10; G06F 16/1744; G06F 17/30153; G06F 2212/1044; G06F 2212/657
See application file for complete search history.

(56) References Cited

U.S. PATENT DOCUMENTS

| 2016/0077968 | A1* | 3/2016 | Sela | G06F 12/0246 |
| | | | | 711/118 |
| 2016/0124683 | A1* | 5/2016 | Zhang | G06F 3/0661 |
| | | | | 711/154 |
| 2017/0220262 | A1* | 8/2017 | Zhang | G06F 3/0608 |

* cited by examiner

*Primary Examiner* — Glenn Gossage
(74) *Attorney, Agent, or Firm* — Hoffman Warnick LLC (57) ABSTRACT

A system, method and program product for exploiting in-storage transparent compression. A storage infrastructure is disclosed that includes: a storage device having physical block address (PBA) storage of a defined capacity, a transparent compression system that compresses data written to the PBA storage, and a logical block address-to-physical block address mapping table; and a host having a memory management system that includes: an initialization system that allocates an amount of logical block address (LBA) storage for the host having a capacity greater than the defined capacity of the PBA storage, and that creates a dummy file that consumes LBA storage without consuming any PBA storage; a system that gathers current PBA and LBA usage information. The dummy file manager may adjust the size of the dummy file by truncating or appending sectors to the dummy file using a filesystem on the host, or using an allocation or deallocation function that does not incur any input/output (I/O) operations within the storage device. Dummy storage file sectors of the LBA storage may be mapped to dummy PBA storage that does not consume any physical storage in response to detecting a predefined content pattern indicative of dummy file sectors. The memory management system may device the LBA storage into partitions, with each partition receiving a dummy file.

20 Claims, 6 Drawing Sheets

(52) U.S. Cl.
CPC ............... *G06F 2212/1044* (2013.01); *G06F 2212/401* (2013.01); *G06F 2212/657* (2013.01)

STORAGE INFRASTRUCTURE AND METHOD FOR EXPLOITING IN-STORAGE TRANSPARENT COMPRESSION USING A DUMMY FILE THAT CONSUMES LBA STORAGE WITHOUT CONSUMING PBA STORAGE

TECHNICAL FIELD

The present invention relates to the field of storage infrastructures, and particularly to a storage infrastructure and method for exploiting in-storage transparent compression.

BACKGROUND

Lossless data compression is widely used in data storage and communication systems to reduce the cost and/or improve speed performance. In current practice, lossless data compression is mostly implemented at either the application level (e.g., various databases) or filesystem level (e.g., a Z File System and A Hadoop Distributed File System). Nevertheless, application-level and filesystem-level data compression is subject to noticeable overhead in terms of central processing system (CPU) cycles and in-memory data movement.

Compression can also be implemented inside storage devices without consuming any CPU cycles and requiring any in-memory data movement on the host side, which is referred to as in-storage transparent compression. The use of internal address mapping makes it practically feasible for solid-state storage devices to implement in-storage transparent compression. Moreover, as magnetic recording hard disk drives start to employ shingled recording technology, which demands the use of internal address mapping as well, future hard disk drives could also readily support in-storage transparent compression.

However, being transparent to the host (in particular filesystems running on the host), in-storage compression cannot be directly leveraged by the host to store more data on a storage device, unless there is a mechanism to pass certain information (e.g., in-storage compression efficiency and runtime available storage capacity) to the host.

Unfortunately, existing storage hierarchies (including filesystem, device driver, and storage device input/output (I/O) protocol) do not directly support such information passing from storage devices to the host. This makes it impossible for the host to utilize the extra storage capacity created by in-storage transparent compression, unless the storage hierarchy is accordingly modified.

Unfortunately, adopting such a modification would be very difficult to achieve by current mainstream ecosystems. As a result, most storage devices do not implement in-storage transparent compression at all. Although few commercial solid-state storage devices implement in-storage compression, they utilize the extra storage space created by compression solely for their own internal use (e.g., to improve the efficiency of their internal garbage collection) without changing the storage capacity visible to the host.

SUMMARY

Accordingly, embodiments of the present disclosure are directed to systems and methods for allowing computing systems to exploit in-storage transparent compression.

In a first aspect, there is a storage infrastructure for exploiting in-storage transparent compression, comprising: a storage device having physical block address (PBA) storage of a defined capacity, a transparent compression system that compresses data written to the PBA storage, and a logical block address-to-physical block address (LBA-PBA) mapping table; and a host having a memory management system that includes: an initialization system that allocates an amount of logical block address (LBA) storage for the host having a capacity greater than the defined capacity of the PBA storage, and that creates a dummy file that consumes LBA storage without consuming any PBA storage; a system that gathers current PBA and LBA usage information; and a dummy file manager that adjusts a size of the dummy file based on the current PBA and LBA usage information.

In a second aspect, there is a method for exploiting in-storage transparent compression from a host that has a mounted storage device having physical block address (PBA) storage of a defined capacity, a transparent compression system that compresses data written to the PBA storage, and an LBA-PBA mapping table, the method comprising: allocating an amount of logical block address (LBA) storage for the host having a capacity greater than the defined capacity of the PBA storage; creating a dummy file that consumes LBA storage without consuming any PBA storage; gathering current PBA and LBA usage information; and adjusting a size of the dummy file based on the current PBA and LBA usage information.

In a third aspect, there is a program product stored on a computer readable medium, which when executed by a computing system exploits in-storage transparent compression from a host in communication with a mounted storage device having physical block address (PBA) storage of a defined capacity, a transparent compression system that compresses data written to the PBA storage, and an LBA-PBA mapping table, the program product comprising: program code for allocating an amount of logical block address (LBA) storage for the host having a capacity greater than the defined capacity of the PBA storage; program code for creating a dummy file that consumes LBA storage without consuming any PBA storage; program code for gathering current PBA and LBA usage information; and program code for adjusting a size of the dummy file based on the current PBA and LBA usage information.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
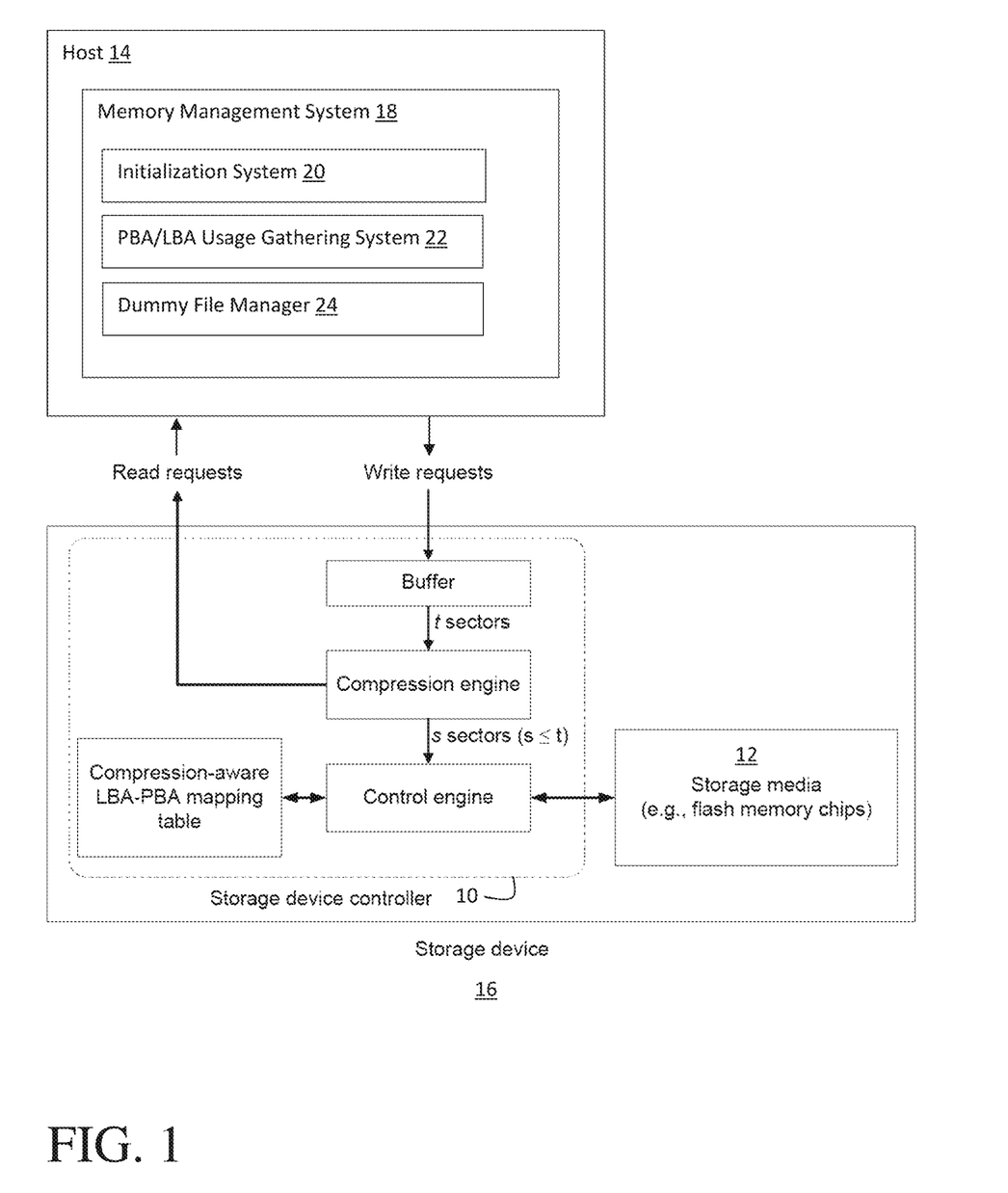
FIG. 1 depicts a storage infrastructure capable of exploiting in-storage transparent compression according to embodiments of the invention.

Shown in FIG. 1 is a storage infrastructure that includes a storage device 16 that employs transparent compression and a host (i.e., server, CPU, etc.) 14 that includes a memory management system 18 that can exploit the transparent compression without changing current storage hierarchy infrastructures. Storage device 16, which may for example be implemented as a controller card, generally includes a storage device controller 10 and storage media 12 (e.g., flash memory chips) of a defined storage capacity.

Storage device 16 typically stores data in the unit of sectors, and the capacity of each sector is, e.g., 512 bytes (i.e., 512B) or 4 kB. When storage device 16 is mounted on host 14 (e.g., a computer or server), the storage device 16 exposes its storage space as an array of sectors to the host 14, where each sector associates with a unique logical block address (LBA). All the LBAs of one storage device are contiguous starting from 0. In a traditional approach, if the sector size of one storage device is 4 kB and the storage device exposes total $2^{20}$ (i.e., 1M) unique LBAs (i.e., from 00000 to $7FFFF_h$) to the host 14, the storage device is mounted on the host with a total 4 TB storage space. The host 14 manages the data storage (e.g., read and write operations) on this storage device via the 1M LBAs.

Storage device 16 manages internal storage media in the unit of sectors as well, where each sector is assigned with a unique physical block address (PBA). Let M and N denote the total number of unique LBAs and PBAs respectively of one storage device, and M<N. Storage device 16 internally maintains an injective LBA-to-PBA mapping. In all the solid-state storage devices and latest hard disk drives using magnetic shingled recording technology, the internal LBA-to-PBA mapping changes over the time (i.e., one LBA could be mapped to different PBAs at different times). The host 14 manages the data storage only in the space of LBAs, and LBA-to-PBA mapping is handled by the storage device internally and is completely transparent to the host 14. Such an extra layer of address mapping inside storage devices makes it possible to implement in-storage transparent compression.

Without transparent compression, when the host 14 writes data to the storage device 16, the data are first buffered inside the storage device controller 10, and then written to the storage media 12. To implement transparent compression, a compression engine may be utilized. Suppose the storage device controller 10 has buffered t sectors that associate with t LBAs. The storage device controller 10 can utilize the compression engine to compress those t sectors of data into s sectors (s≤t), where the compression can be carried out on each sector independently or across several sectors. Then the storage device controller 10 stores the compressed data to s PBAs. The storage device controller 10 accordingly updates the LBA-to-PBA mapping information so that the controller can correctly read and decompress the data from the storage media 12 to recover the original uncompressed data of any given LBA.

Intuitively, when using in-storage transparent compression, if the storage device 16 can on-the-fly send the information about the true usage of physical storage space back to the host 14, the host 14 can accordingly leverage the extra space created by the in-storage transparent compression to store more data on the storage device 16. However, current storage hierarchies do not provide a machanism to realize such storage-device-to-host information delivery. Under current practice, once a storage device 16 mounts on a host 14, its storage capacity remains unchanged. Although it is possible to modify a current storage hierarchy (e.g., modify filesystem, device driver, and storage I/O protocol) to support such cross-layer information delivery, the modification is very difficult to be adopted by the mainstream ecosystem. As a result, most storage devices do not implement in-storage transparent compression at all. As noted, while a few commercial solid-state storage devices implement in-storage compression, they utilize the extra storage space created by compression solely for their own internal use (e.g., to improve the efficiency of their internal garbage collection) without changing the storage capacity visible to the host.

Memory management system 18 enables the host 14 to explicitly utilize (i.e., exploit) the extra storage space created by in-storage transparent compression without demanding any changes of current storage hierarchy infrastructures. In the embodiment shown in FIG. 1, memory management system 18 generally includes: an initialization system 20 that allocates/exposes an amount of storage (e.g., 8 terabytes) for the host 14 greater than what is actually available on the storage device (e.g., 4 terabytes); a PBA/LBA usage gathering system 22 that tracks PBA and LBA usage information from the storage device and filesystem; and a dummy file manager 24 that creates and adjusts dummy files within the LBA storage space managed by the host 14.

Figure 2:
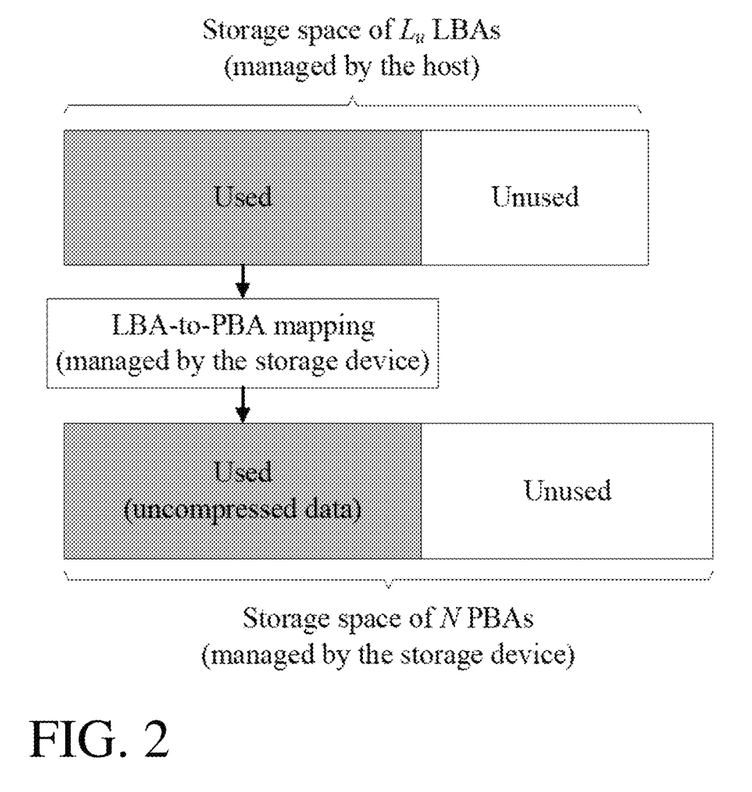
FIG. 2 depicts LBA and PBA usage without using in-storage compression.

FIG. 2 illustrates LBA to PBA mapping without using in-storage transparent compression. Suppose the storage device 16 internally has N unique PBAs, i.e., it can physically store up to N sectors of data. The storage device 16 simply exposes a storage space spanning $L_u$ contiguous LBAs to the host, where $N \geq L_u$, as shown. Thus for example, if the storage device 16 has 4 terabytes of storage, it may expose all 4 terabytes to the host 14 (or a little less if some storage is internally needed by the storage device 16).

Figure 3:
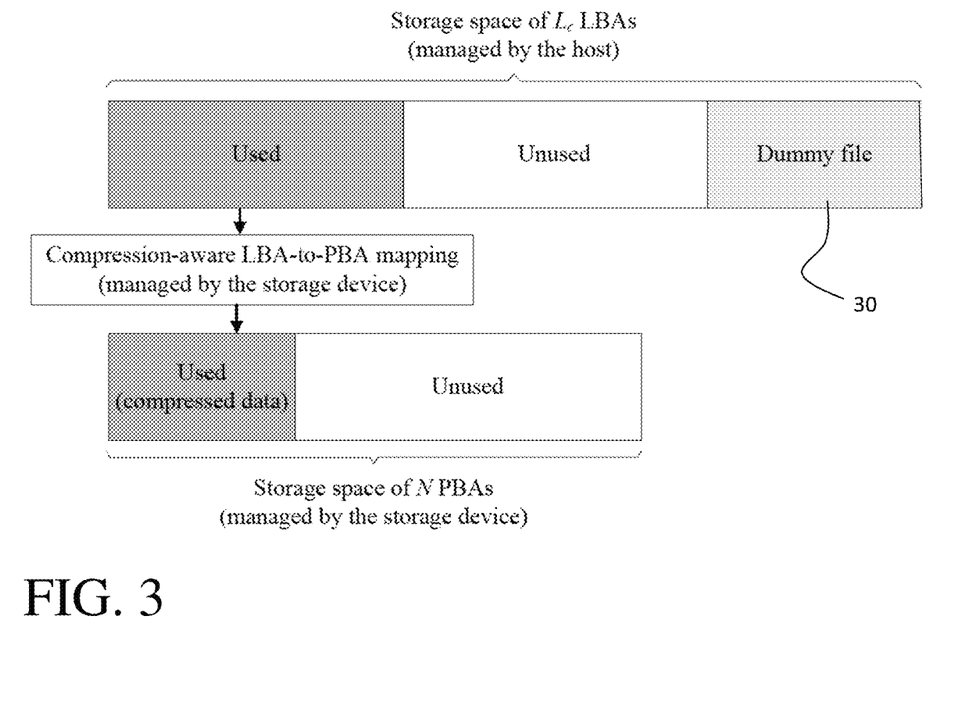
FIG. 3 depicts LBA and PBA usage according to embodiments of the invention.

FIG. 3 shows how the memory management system 18 is utilized with in-storage transparent compression. In this case, the initialization system 20 exposes a storage space spanning $L_c$ contiguous LBAs to the host 14, where $L_c > L_u$. For example, if the storage device 16 has 4 terabytes of storage, initialization system 20 may expose a larger amount of LBA storage (e.g., up to 8 terabytes) to the host 14. To ensure that space on the storage device 16 is not exceeded, initialization system 20 also creates a special file, called a dummy file 30, within the storage space of $L_c$ LBAs on the host side. In the above example, the dummy file 30 may initially consume 4 terabytes of LBA storage, thus leaving 4 terabytes of unused storage (i.e., the amount of actual PBA storage on the storage device 16). As data is written to and compressed on the storage device 16 over time, PBA/LBA usage gathering system 22 determines the amount of actual physical and logical storage in use, e.g., 2 terabytes of data written to LBA storage by the host 14 may be compressed and stored in 1 terabyte of PBA storage. Dummy file manager 24 then adjusts the size of the dummy file 30 to account for the compression. For instance, the dummy file size may be reduced from 4 terabytes to 3 terabytes thus creating an additional 1 terabyte of LBA storage available to the host 14.

The LBAs occupied by the dummy file 30 do not map to PBAs inside the storage device 16, while the LBAs occupied by all the other real files are mapped to PBAs inside the storage device 16. Because of the runtime data compression efficiency variability, over-commitment of storage space to the host 14 is prevented by dynamically adjusting the size of the dummy file 30 in adaptation to the runtime data compression efficiency.

Accordingly, the LBA storage initially includes unused sectors and sectors consumed with the dummy file. The size of the dummy file may be initially selected such that the unused sectors of the LBA storage have a capacity less than or equal to the defined capacity of the PBA storage. As data is written from the host to the storage device the unused storage is transformed to comprise both used and unused sectors. On the storage device, the PBA storage likewise includes used sectors having compressed data and unused sectors. In one illustrative embodiment, the size of the dummy file is adjusted so that a capacity of the unused sectors on the LBA storage remains less than or equal to a capacity of the unused sectors on the PBA storage.

Changing the size of the dummy file 30 by memory management system 18 is done through normal filesystems without demanding any modification of the host-side storage I/O software stack. In particular, memory management system 18 may be implemented as a driver or application called $APP_c$ (in either the kernel mode or user mode) implemented to run on the host 14, which is responsible for changing the size of dummy file 30. The application $APP_c$ can directly communicate with the storage device 16 to obtain the runtime in-storage compression efficiency information, and it accordingly adjusts the size of dummy files through underlying filesystems.

Figure 4:
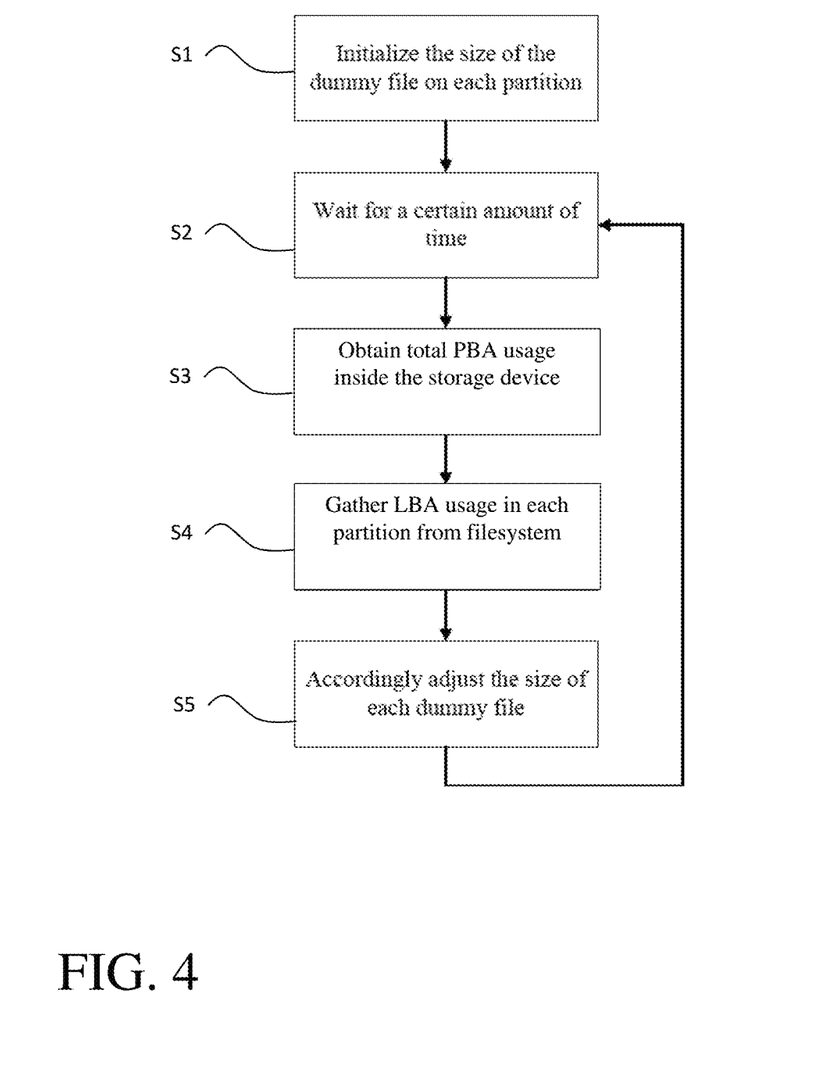
FIG. 4 depicts an operational flow diagram of a process for initializing and changing the size of dummy files according to embodiments of the invention.

An operational flow diagram is shown in FIG. 4 for a multiple partition process. Let p denote the number of partitions on the storage device 16, and let $L_i$(where $1 \leq i \leq p$) denote the number of LBAs exposed to the host 14 on the i-th partition. Thus, $L_1+L_2+ \ldots +L_p=L_c>L_u$. On each partition, the application $APP_c$ creates one dummy file, denoted as $f_i$, and let $s_i$ denote the number of LBAs occupied by the dummy file $f_i$. At S1, the application $APP_c$ initializes the size of all the dummy files and after a certain amount of time has elapsed during run time at S2, the application $APP_c$ periodically communicates with the storage device 16 to obtain the total PBA usage inside the storage device at S3. Additionally, the application $APP_c$, checks with the filesystem at S4 to gather the LBA usage information in each partition. Based on this information, the application $APP_c$, adjusts the size of each dummy file (i.e., the value of each $s_i$).

Different sets of rules may be utilized to determine how to initialize and adaptively adjust the size of dummy files. For example: (1) the total number of unused LBAs (i.e., the unoccupied storage space within the $L_c$ LBAs visible to the host) should not be larger than the total number of unused PBAs (i.e., the un-occupied physical storage space inside storage device); and (2) during the run time, the size of the dummy file on each partition is proportional to the storage space allocated to this partition by the host.

Based upon the above two rules, the initialization and adjustment of dummy files' sizes can be implemented as follows. At the beginning, the system sets $s_1:s_2: \ldots :s_p=L_1:L_2: \ldots :L_p$, and $s_1+s_2+ \ldots +s_p=L_c-L_u$.

During run time, let $r_i$ denote the number of LBAs being occupied by files other than the dummy file in the i-th partition, and define $R=r_1+r_2+ \ldots +r_p$. Let $N_c$ denote the total number of PBAs being used on the storage device. Recall that $L_i$ (where $1 \leq i \leq p$) denotes the number of LBAs exposed to the host on the i-th partition of the storage device. The system sets the values of each dummy file to satisfy the following conditions:

$s_1:s_2: \ldots :s_p=L_1:L_2: \ldots :L_p$, and $s_1+s_2+ \ldots +s_p=L_c-(N-N_c)-R$.

To practically implement the process, one remaining issue is how the application $APP_c$ can accomplish the size adjustment of each dummy file and meanwhile ensure the dummy files do not occupy PBAs in the storage device. Different solutions are provided according to the following two different scenarios:

Scenario 1: The filesystem supports the pre-allocation and de-allocation operations (i.e., the function realized by the system call fallocate in Linux). The pre-allocation and de-allocation functions make it possible for applications to allocate and de-allocate storage spaces (i.e., LBAs) without incurring any I/O operations to the storage devices. When the applications call the filesystem to pre-allocate/de-allocate storage space, the filesystem simply holds/releases certain LBAs for the applications without writing anything to these LBAs. Hence, once the application $APP_c$ utilizes such filesystem-level support to manipulate the size of all the dummy files, the dummy files will not occupy any PBAs in the storage device.

Scenario 2: The filesystem does not support the pre-allocation and de-allocation operations. In this case, a dummy sector is defined with a fixed content pattern (e.g., a recognizable signature such as all-zeros or all-ones), and the application $APP_c$ fills all the dummy files with the dummy sectors. When the application $APP_c$ needs to increase the size of one dummy file by d sectors, it appends d dummy sectors to the dummy file through the filesystem (i.e., the filesystem allocates d unused LBAs and then writes the data to these LBAs). On the storage device side, the storage device controller 10 on-the-fly detects the content of incoming data to be written. Once the storage device controller 10 identifies the dummy sector content pattern for one LBA, the controller 10 will map this LBA to a fixed dummy PBA that does not associate with any real physical storage space.

Figure 5:
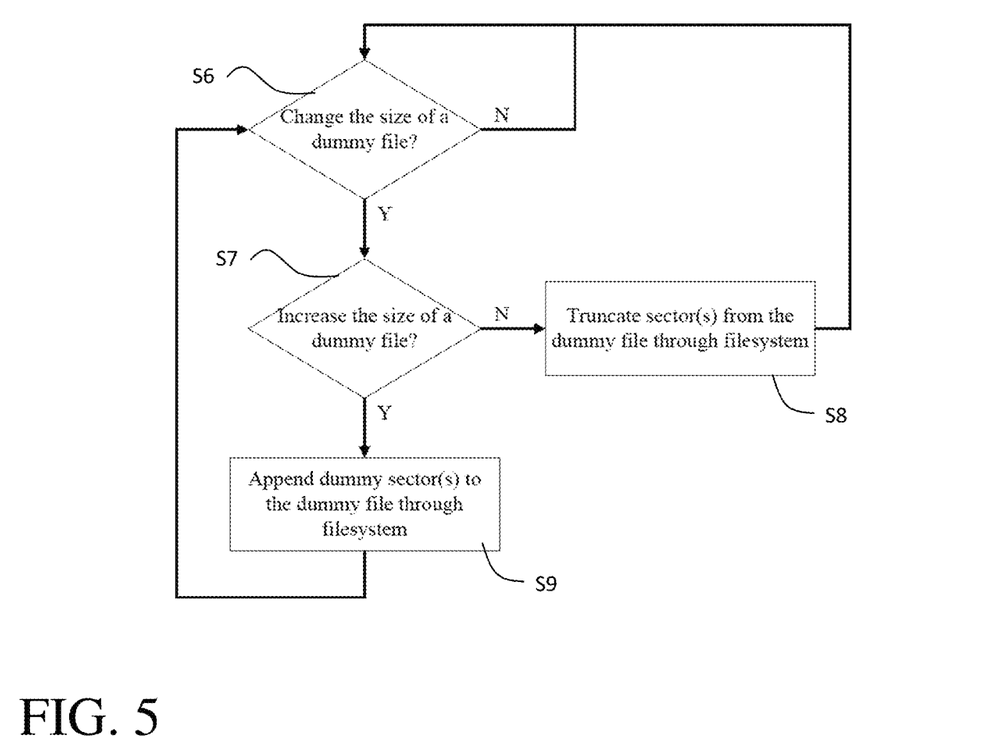
FIG. 5 depicts an operational flow diagram of a process of altering the size of a dummy file according to embodiments of the invention.

FIG. 5 shows the operational flow diagram when the application $APP_c$ aims to change the size of one dummy file. At S6, a determination is made whether the size needs to be changed. If yes, then at S7, a determination is made whether the size of the dummy file should be increased. If no, then sectors of the dummy file are truncated via the file system at S8. If yes, then dummy sectors are appended to the dummy file via the filesystem at S9.

Figure 6:
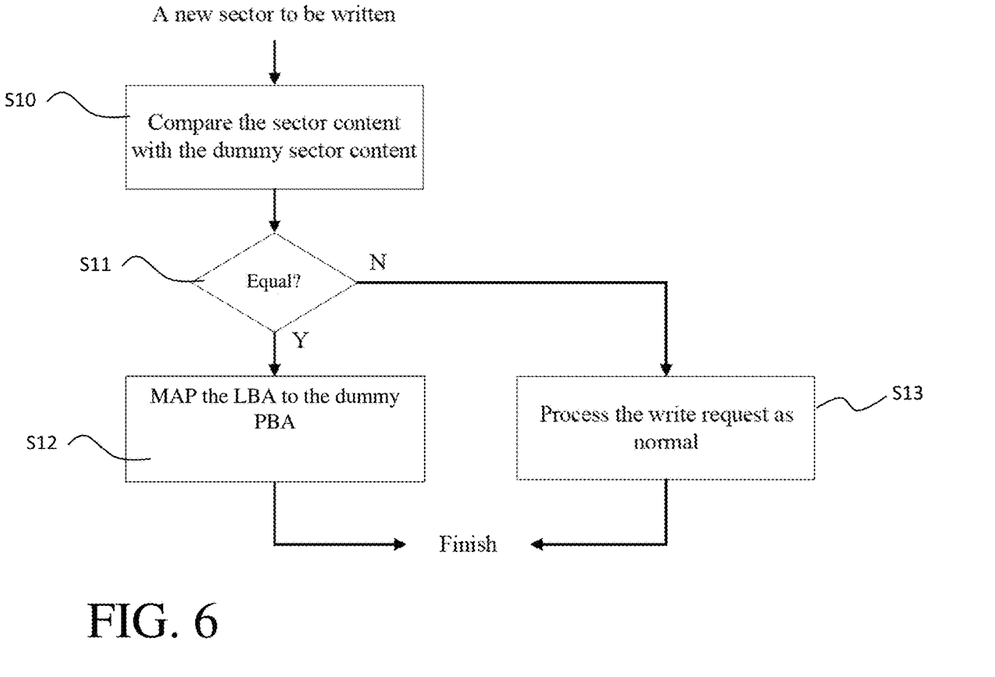
FIG. 6 depicts an operational flow diagram of a process implemented by a storage device controller in response to an incoming sector to be written according to embodiments of the invention.

FIG. 6 shows the operational flow diagram of the storage device controller in response to an incoming sector to be written under the second scenario. At S10 the storage device controller compares the sector content to be written with dummy sector content (e.g., all zeros or all ones). If they match at S11, the LBA is mapped to a dummy PBA at S12 (i.e., no physical space is used). If they do not match at S11, then the storage device controller processes the write request as normal at S13. Compared with the solution to the first scenario above, the solution for this second scenario indeed incurs an I/O operation when the application $APP_c$ increases the size of one dummy file.

It is understood that the memory management system 18 may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGAs), or programmable logic arrays (PLAs) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by hardware and/or computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A storage infrastructure for exploiting in-storage transparent compression, comprising:
   a storage device having physical block address (PBA) storage of a defined capacity, a transparent compression system that compresses data written to the PBA storage, and a logical block address-to-physical block address (LBA-PBA) mapping table; and
   a host having a memory management system that includes:
     an initialization system that allocates an amount of logical block address (LBA) storage for the host having a capacity greater than the defined capacity of the PBA storage, and that creates a dummy file that consumes LBA storage without consuming any PBA storage;
     a system that gathers current PBA and LBA usage information; and
     a dummy file manager that adjusts a size of the dummy file based on the current PBA and LBA usage information.

2. The storage infrastructure of claim 1:
   wherein the LBA storage initially includes unused sectors and sectors consumed with the dummy file; and
   wherein the size of the dummy file is initially selected such that the unused sectors of the LBA storage have a capacity less than or equal to the defined capacity of the PBA storage.

3. The storage infrastructure of claim 2,
wherein, once data is written from the host to the storage device, the LBA storage additionally includes used sectors, and the PBA storage includes used sectors having compressed data and unused sectors; and
wherein the size of the dummy file is adjusted so that a capacity of the unused sectors on the LBA storage remains less than or equal to a capacity of the unused sectors on the PBA storage.

4. The storage infrastructure of claim 1, wherein the dummy file manager adjusts the size of the dummy file by truncating or appending sectors to the dummy file using a filesystem on the host.

5. The storage infrastructure of claim 1, wherein the dummy file manager adjusts the size of the dummy file using an allocation or deallocation function that does not incur any input/output (I/O) operations with the storage device.

6. The storage infrastructure of claim 1, wherein the storage device manages PBA activity by:
receiving LBA data from the host;
searching file sectors of the LBA data at the storage device for a predefined content pattern indicative of dummy file sectors; and
in response to detecting the predefined content pattern, mapping the dummy file sectors of the LBA storage to dummy PBA storage that does not consume any physical storage.

7. The storage infrastructure of claim 1, wherein the memory management system divides the LBA storage into partitions in which each partition receives a dummy file.

8. A method for exploiting in-storage transparent compression from a host that has a mounted storage device having physical block address (PBA) storage of a defined capacity, a transparent compression system that compresses data written to the PBA storage, and a logical block address-to-physical block address (LBA-PBA) mapping table, the method comprising:
allocating an amount of logical block address (LBA) storage for the host having a capacity greater than the defined capacity of the PBA storage;
creating a dummy file that consumes LBA storage without consuming any PBA storage;
gathering current PBA and LBA usage information; and
adjusting a size of the dummy file based on the current PBA and LBA usage information.

9. The method of claim 8:
wherein the LBA storage initially includes unused sectors and sectors consumed with the dummy file; and
wherein the size of the dummy file is initially selected such that the unused sectors of the LBA storage have a capacity less than or equal to the defined capacity of the PBA storage.

10. The method of claim 9:
wherein, once data is written from the host to the storage device, the LBA storage additionally includes used sectors, and the PBA storage includes used sectors having compressed data and unused sectors; and
wherein the size of the dummy file is adjusted so that a capacity of the unused sectors on the LBA storage remain less than or equal to a capacity of the unused sectors on the PBA storage.

11. The method of claim 8, wherein the size of the dummy file is adjusted by truncating or appending sectors to the dummy file using a filesystem on the host.

12. The method of claim 8, wherein the size of the dummy file is adjusted using an allocation or deallocation function that does not incur any I/O operations with the storage device.

13. The method of claim 8, wherein the storage device manages PBA activity by:
receiving LBA data from the host;
searching file sectors of the LBA data at the storage device for a predefined content pattern indicative of dummy file sectors; and
in response to detecting the predefined content pattern, mapping the dummy file sectors of the LBA storage to dummy PBA storage that does not consume any physical storage.

14. The method of claim 8, wherein the LBA storage is divided into partitions in which each partition receives a dummy file.

15. A program product stored on a computer readable medium, which when executed by a computing system exploits in-storage transparent compression from a host in communication with a mounted storage device having physical block address (PBA) storage of a defined capacity, a transparent compression system that compresses data written to the PBA storage, and a logical block address-to-physical block address (LBA-PBA) mapping table, the program product comprising:
program code for allocating an amount of logical block address (LBA) storage for the host having a capacity greater than the defined capacity of the PBA storage;
program code for creating a dummy file that consumes LBA storage without consuming any PBA storage;
program code for gathering current PBA and LBA usage information; and
program code for adjusting a size of the dummy file based on the current PBA and LBA usage information.

16. The program product of claim 15:
wherein the LBA storage initially includes unused sectors and sectors consumed with the dummy file; and
wherein the size of the dummy file is initially selected such that the unused sectors of the LBA storage have a capacity less than or equal to the defined capacity of the PBA storage.

17. The program product of claim 16:
wherein, once data is written from the host to the storage device, the LBA storage additionally includes used sectors, and the PBA storage includes used sectors having compressed data and unused sectors; and
wherein the size of the dummy file is adjusted so that a capacity of the unused sectors on the LBA storage remain less than or equal to a capacity of the unused sectors on the PBA storage.

18. The program product of claim 15, wherein the size of the dummy file is adjusted by truncating or appending sectors to the dummy file using a filesystem on the host.

19. The program product of claim 15, wherein the size of the dummy file is adjusted using an allocation or deallocation function that does not incur any I/O operations with the storage device.

20. The program product of claim 15, wherein the LBA storage is divided into partitions in which each partition receives a dummy file.

* * * * *